(12) United States Patent
Nguyen et al.

(10) Patent No.: US 8,997,868 B2
(45) Date of Patent: Apr. 7, 2015

(54) METHODS OF USING NANOPARTICLE SUSPENSION AIDS IN SUBTERRANEAN OPERATIONS

(75) Inventors: Philip D. Nguyen, Duncan, OK (US); Richard D. Rickman, Duncan, OK (US); Jimmie D. Weaver, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 382 days.

(21) Appl. No.: 13/529,510

(22) Filed: Jun. 21, 2012

(65) Prior Publication Data
US 2013/0341020 A1 Dec. 26, 2013

(51) Int. Cl.
| | | |
|---|---|---|
| C09K 8/38 | (2006.01) | |
| C09K 8/50 | (2006.01) | |
| E21B 33/138 | (2006.01) | |
| C09K 8/518 | (2006.01) | |
| C09K 8/70 | (2006.01) | |
| C09K 8/94 | (2006.01) | |
| E21B 43/02 | (2006.01) | |
| B82Y 30/00 | (2011.01) | |

(52) U.S. Cl.
CPC ............ C09K 8/38 (2013.01); E21B 33/138 (2013.01); *E21B 43/025* (2013.01); *C09K 2208/30* (2013.01); C09K 8/518 (2013.01); C09K 8/703 (2013.01); C09K 8/94 (2013.01); *C09K 2208/10* (2013.01); *B82Y 30/00* (2013.01)

(58) Field of Classification Search
CPC .. C07D 417/12; C07D 401/12; C07D 413/12; C07D 405/12; C09K 2208/30; C09K 8/506; C09K 8/68; C09K 8/516; E21B 43/24; E21B 43/40; E21B 21/08; E21B 43/025; E21B 43/25

See application file for complete search history.

(56) References Cited

U.S. PATENT DOCUMENTS

| | | | |
|---|---|---|---|
| 4,585,064 | A | 4/1986 | Graham et al. |
| 4,670,501 | A | 6/1987 | Dymond et al. |
| 5,249,627 | A | 10/1993 | Harms et al. |
| 5,833,000 | A | 11/1998 | Weaver et al. |
| 5,839,510 | A | 11/1998 | Weaver et al. |
| 5,853,048 | A | 12/1998 | Weaver et al. |
| 5,905,061 | A | 5/1999 | Patel |
| 5,977,031 | A | 11/1999 | Patel |
| 6,287,639 | B1 | 9/2001 | Schmidt et al. |
| 6,311,773 | B1 | 11/2001 | Todd et al. |
| 6,439,309 | B1 | 8/2002 | Matherly et al. |
| 6,582,819 | B2 | 6/2003 | McDaniel et al. |
| 6,677,426 | B2 | 1/2004 | Noro et al. |
| 6,828,279 | B2 | 12/2004 | Patel et al. |
| 7,032,664 | B2 | 4/2006 | Lord et al. |
| 7,153,575 | B2 | 12/2006 | Anderson et al. |
| 7,392,847 | B2 | 7/2008 | Gatlin et al. |
| 7,534,745 | B2 | 5/2009 | Taylor et al. |
| 7,559,369 | B2 | 7/2009 | Roddy et al. |
| 7,645,723 | B2 | 1/2010 | Kirsner et al. |
| 7,673,686 | B2 | 3/2010 | Nguyen et al. |
| 7,696,131 | B2 | 4/2010 | Oyler et al. |
| 7,806,183 | B2 | 10/2010 | Roddy et al. |
| 7,819,192 | B2 | 10/2010 | Weaver et al. |
| 7,825,074 | B2 | 11/2010 | Schmidt et al. |
| 7,892,352 | B2 | 2/2011 | Roddy et al. |
| 7,956,017 | B2 | 6/2011 | Gatlin et al. |
| 8,003,579 | B2 | 8/2011 | Akarsu et al. |
| 8,066,068 | B2 | 11/2011 | Lesko et al. |
| 8,727,004 | B2 | 5/2014 | Bull et al. |
| 2005/0016726 | A1 | 1/2005 | Nguyen et al. |
| 2005/0126778 | A1 | 6/2005 | McElfresh et al. |
| 2005/0197257 | A1 | 9/2005 | Bouwmeester |
| 2005/0274517 | A1 | 12/2005 | Blauch et al. |
| 2005/0277554 | A1 | 12/2005 | Blauch et al. |
| 2007/0131422 | A1 | 6/2007 | Gatlin et al. |
| 2007/0131425 | A1 | 6/2007 | Gatlin et al. |
| 2007/0289781 | A1 | 12/2007 | Rickman et al. |
| 2008/0006405 | A1 | 1/2008 | Rickman et al. |
| 2008/0153720 | A1 | 6/2008 | Huang et al. |
| 2008/0277116 | A1 | 11/2008 | Roddy et al. |
| 2009/0186781 | A1 | 7/2009 | Zhang |
| 2009/0192052 | A1 | 7/2009 | Zhang |
| 2010/0155058 | A1 | 6/2010 | Gordy et al. |
| 2010/0160187 | A1 | 6/2010 | Nguyen et al. |
| 2010/0212898 | A1 | 8/2010 | Nguyen et al. |
| 2010/0252259 | A1 | 10/2010 | Horton |
| 2011/0000672 | A1 | 1/2011 | Huang |

(Continued)

FOREIGN PATENT DOCUMENTS

| | | |
|---|---|---|
| WO | 2011149618 A1 | 12/2011 |
| WO | 2013191867 A1 | 12/2013 |

OTHER PUBLICATIONS

Ajayi et al., "Channel Hydraulic Fracturing and its Applicability in the Marcellus Shale," SPE 149426, 2011.

(Continued)

*Primary Examiner* — Zakiya W Bates
(74) *Attorney, Agent, or Firm* — McDermott Will & Emery LLP; Craig W. Roddy

(57) ABSTRACT

Methods of drilling wellbores, placing proppant packs in subterranean formations, and placing gravel packs in wellbores may involve fluids, optionally foamed fluids, comprising nanoparticle suspension aids. Methods may be advantageously employed in deviated wellbores. Some methods may involve introducing a treatment fluid into an injection wellbore penetrating a subterranean formation, the treatment fluid comprising a base fluid, a foaming agent, a gas, and a nanoparticle suspension aid; and producing hydrocarbons from the subterranean formation via a production wellbore proximal to the injection wellbore.

18 Claims, No Drawings

(56) References Cited

U.S. PATENT DOCUMENTS

| | | |
|---|---|---|
| 2011/0030950 A1 | 2/2011 | Weaver et al. |
| 2011/0039737 A1 | 2/2011 | Schmidt et al. |
| 2012/0305245 A1 | 12/2012 | Loiseau et al. |
| 2013/0341022 A1 | 12/2013 | Nguyen et al. |

OTHER PUBLICATIONS

Dickinson et al., "Factors Controlling the Formation and Stability of Air Bubbles Stabilized by Partially Hydrophobic Silica Nanoparticles," Langmuir 2004, 20, 8517-8525.

Ravera et al., "Effect of Nanoparticles on the Interfacial Properties of Liquid/Liquid and Liquid/Air Surface Layers," J. Phys. Chem B 2006, 110, 19543-19551.

Du et al., "Outstanding Stability of Particle-Stabilized Bubbles," Langmuir 2003, 19, 3106-3108.

Alargova et al., "Foam Superstabilization by Polymer Microrods," Langmuir 2004, 20, 10371-10374.

Laponite® Technology, Laponite Technology Presentation, Rockwood Clay Additives, Not dated.

International Search Report and Written Opinion for PCT/US2013/043538 dated Jul. 19, 2013.

Official Action for Australian Patent Application No. 2013277674 dated Dec. 23, 2014.

US 8,997,868 B2

METHODS OF USING NANOPARTICLE SUSPENSION AIDS IN SUBTERRANEAN OPERATIONS

BACKGROUND

The present invention relates to methods of treating subterranean formations with treatment fluids comprising nanoparticle suspension aids.

Gelled fluids, because of the increased viscosity, are useful in a variety of subterranean operations including those that control fluid flow (e.g., enhanced oil recovery, fluid loss control, and fluid diversion) or transport of particles like proppants and gravel. Additionally, crosslinking agents are often used to increase the viscosity and stability of the gelled fluid to further increase the fluid's utility in some downhole environments.

With respect to controlling fluid flow, gelled fluids generally enable more control over the movement of the gelled fluid or another fluid that contacts the gelled fluid. For example, a gelled fluid may be utilized for enhanced oil recovery by pushing hydrocarbons through a formation from an injection well to a production well. Additionally, in fluid diversion, a gelled fluid can prevent another fluid from entering a zone by effectively sealing off the zone. In fluid loss control, the increased viscosity of gelled fluids mitigates the loss of the gelled fluid into the subterranean formation. Accordingly, higher viscosity gels, i.e., higher concentrations of gelling agents and crosslinkers, can provide better fluid flow control in a variety of applications.

With respect to transporting and placing particles, gelled fluids aid in the suspension of the particles so that the particles may be transported to and placed in a desired location within a subterranean formation, e.g., in a proppant pack and/or a gravel pack. It is generally preferred to perform particle placement operations with the highest possible particle concentration. Increasing the particle concentration in a treatment fluid generally requires a higher concentration of gelling agents and/or crosslinker.

However, in each of these gelled fluid applications, use of higher gelling agent and/or crosslinker concentrations can lead to reduced pumpability of the treatment fluid, damage of the wellbore or subterranean formation, and/or a need for remedial operations to clean out any gelled fluids from the wellbore, subterranean formation, or particle pack. Further, gelling agents designed to be operable at higher temperatures, e.g., approaching the limits of chemical decomposition at about 300° F., can be more problematic in each of these areas as a result of, inter alia, higher molecular weights, higher degrees of crosslinking, and more chemically stable structures. Accordingly, subterranean operations are often performed at moderate gelling agent and/or crosslinking agent concentrations to mitigate any complications. As many gelling agents are used in a variety of fluids outside the oil and gas industry, the demand is increasing while supply is decreasing. Therefore, the cost of gelling agents are increasing, and consequently the cost of subterranean operations, especially considering the amount of the gelling agent needed for a single treatment.

Therefore, a practical replacement and/or supplement to gelling agents and/or crosslinking agents that can overcome any shortcomings and yet still effectively carry particulate may be of value to one of ordinary skill in the art.

SUMMARY OF THE INVENTION

The present invention relates to methods of treating subterranean formations with treatment fluids comprising nanoparticle suspension aids.

In some embodiments, the present invention provides for a method comprising: introducing a treatment fluid into an injection wellbore penetrating a subterranean formation, the treatment fluid comprising a base fluid, a foaming agent, a gas, and a nanoparticle suspension aid; and producing hydrocarbons from the subterranean formation via a production wellbore proximal to the injection wellbore.

In other embodiments, the present invention provides for a method comprising: introducing a diverting fluid into a zone within a subterranean formation via a wellbore, the diverting fluid comprising a base fluid, a foaming agent, a gas, and a nanoparticle suspension aid; allowing the diverting fluid to seal rock surfaces of the zone of the subterranean formation for fluid diversion; and introducing a treatment fluid into the subterranean formation such that the diverting fluid substantially diverts the treatment fluid from the zone within the subterranean formation.

In yet other embodiments, the present invention provides for a method comprising: introducing a treatment fluid into a subterranean formation via a wellbore having a bottom hole circulating temperature of about 300° F. or greater, the treatment fluid comprising a base fluid, a foaming agent, a gas, and a nanoparticle suspension aid.

The features and advantages of the present invention will be readily apparent to those skilled in the art upon a reading of the description of the preferred embodiments that follows.

DETAILED DESCRIPTION

The present invention relates to methods of treating subterranean formations with treatment fluids comprising nanoparticle suspension aids.

Some embodiments of the present invention may utilize a nanoparticle suspension aid ("NSA"). An NSA may advantageously replace gelling agents and/or crosslinking agents in treatment fluids, including foamed treatment fluids, for use in subterranean operations like operations that control fluid flow (e.g., enhanced oil recovery, fluid loss control, and fluid diversion) or transport of larger particles (e.g., cuttings, proppants, and gravel).

In some instances, an NSA may form a network, referred to herein as an NSA network, through hydrogen bonding that readily forms in static conditions and readily breaks when shear is applied. Further, an NSA network may, in some embodiments, be pH dependent. For example, a fumed silica suspension aid may form a network in acidic conditions that can be broken in slightly basic conditions. This pH dependence may advantageously provide for straightforward remedial operations to break and remove NSA networks, for example, once larger particles have been properly placed in a proppant pack and/or a gravel pack.

For simplicity, as used herein, the term "larger particles" refers to proppant particles, gravel particles, or a combination thereof. Further, as used herein the term "particle pack" refers to proppant packs or gravel packs. As used herein, "proppant particles" and "proppants" may be used interchangeably and refer to any material or formulation that can be used to hold open at least a portion of a fracture. As used herein, a "proppant pack" is the collection of particulates in a fracture. As used herein, "gravel particles" and "gravel" may be used interchangeably and refer to any material or formulation that can be used to form a gravel pack. As used herein, a "gravel pack" is the collection of particulates that form a filter (e.g., for formation fines and/or sand) in an annulus (e.g., an annulus of a wellbore, an annulus between the screen and a wellbore, and the like). It should be understood that the term "particulate" or "particle," and derivatives thereof as used in this disclosure, includes all known shapes of materials, including substantially spherical materials, low to high aspect ratio materials, fibrous materials, polygonal materials (such as cubic materials), and mixtures thereof.

Unexpectedly, the replacement of gelling agents and/or crosslinking agents with an NSA is not a one-to-one change. Rather, an NSA and a gelling agent together appear to have a synergistic effect. Accordingly, the use of an NSA may provide for treatment fluids with significantly less gelling agents and/or crosslinking agents than is traditionally needed to transport and/or place larger particles, e.g., 100 to 1000 times less. As some chemical gelling agents and/or crosslinking agents are becoming more expensive because of reduced supply and increased demand, an NSA may advantageously provide an alternative with less expense and enhanced characteristics, e.g., higher large particle concentrations in treatment fluids and higher temperature stability in maintaining suspended larger particles.

The use of an NSA in conjunction with very low concentrations of gelling agents and/or crosslinking agents may provide for suspension of higher concentrations of larger particles while maintaining a manageable viscosity of the treatment fluid. By maintaining a manageable viscosity with increasing concentrations of larger particles, particle placement operations may be designed to take less time, and consequently be less expensive. Further, in drilling operations, suspending cuttings and transporting to them to the surface more efficiently may allow for faster drilling.

Further, in foamed treatment fluids, an NSA optionally with low concentrations of gelling agents and/or crosslinking agents may enhance the stability of various aspects of the foam, e.g., temperature stability, handling stability, shelf-life, and the like. Enhanced handling stability may advantageously enable the use of foamed fluids in traditionally gelled fluid applications like fluid diversion or enhanced oil recovery, i.e., the foamed fluid is used in conjunction with an injection well to push hydrocarbons to a production well.

The use of an NSA may also advantageously provide for treatment fluids that are stable at higher bottom hole circulating temperatures, e.g., above about 300° F., because an NSA is stable at higher temperatures where traditional polymeric gelling agents begin decomposing. For example, the suspension of cuttings and/or larger particles may be and/or stay suspended at higher bottom hole circulating temperatures.

Further, an NSA may be advantageously employed, especially for particle placement operations or drilling operations, in deviated wellbores where maintaining cuttings and/or larger particles in suspension can be more difficult. As used herein, the term "deviated wellbore" refers to a wellbore in which any portion of the well is oriented between about 55-degrees and about 125-degrees from a vertical inclination. As used herein, the term "highly deviated wellbore" refers to a wellbore that is oriented between about 75-degrees and about 105-degrees off-vertical.

It should be noted that when "about" is provided at the beginning of a numerical list, "about" modifies each number of the numerical list. It should be noted that in some numerical listings of ranges, some lower limits listed may be greater than some upper limits listed. One skilled in the art will recognize that the selected subset will require the selection of an upper limit in excess of the selected lower limit.

In some embodiments, a treatment fluid (e.g., a drilling fluid) for use in conjunction with the present invention may comprise a base fluid and an NSA. In some embodiments, a treatment fluid (e.g., a proppant pack fluid or a gravel pack fluid) for use in conjunction with the present invention may comprise a base fluid, an NSA, and larger particles. Suitable base fluids for use in conjunction with the present invention may include, but not be limited to, oil-based fluids, aqueous-based fluids, aqueous-miscible fluids, water-in-oil emulsions, or oil-in-water emulsions.

Suitable oil-based fluids may include alkanes, olefins, aromatic organic compounds, cyclic alkanes, paraffins, diesel fluids, mineral oils, desulfurized hydrogenated kerosenes, and any combination thereof. Suitable aqueous-based fluids may include fresh water, saltwater (e.g., water containing one or more salts dissolved therein), brine (e.g., saturated salt water), seawater, and any combination thereof. Suitable aqueous-miscible fluids may include, but not be limited to, alcohols, e.g., methanol, ethanol, n-propanol, isopropanol, n-butanol, sec-butanol, isobutanol, and t-butanol; glycerins; glycols, e.g., polyglycols, propylene glycol, and ethylene glycol; polyglycol amines; polyols; any derivative thereof; any in combination with salts, e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate; any in combination with an aqueous-based fluid; and any combination thereof. Suitable water-in-oil emulsions, also known as invert emulsions, may have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, where the amount may range from any lower limit to any upper limit and encompass any subset therebetween. Examples of suitable invert emulsions include those disclosed in U.S. Pat. No. 5,905,061 entitled "Invert Emulsion Fluids Suitable for Drilling," U.S. Pat. No. 5,977,031 entitled "Ester Based Invert Emulsion Drilling Fluids and Muds Having Negative Alkalinity," U.S. Pat. No. 6,828,279 entitled "Biodegradable Surfactant for Invert Emulsion Drilling Fluid," U.S. Pat. No. 7,534,745 entitled "Gelled Invert Emulsion Compositions Comprising Polyvalent Metal Salts of an Organophosphonic Acid Ester or an Organophosphinic Acid and Methods of Use and Manufacture," U.S. Pat. No. 7,645,723 entitled "Method of Drilling Using Invert Emulsion Drilling Fluids," and U.S. Pat. No. 7,696,131 "Diesel Oil-Based Invert Emulsion Drilling Fluids and Methods of Drilling Boreholes," each of which are incorporated herein by reference. It should be noted that for water-in-oil and oil-in-water emulsions, any mixture of the above may be used including the water phase being and/or comprising an aqueous-miscible fluid.

In some embodiments, a treatment fluid for use in conjunction with the present invention may be foamed and comprise an aqueous base fluid, an NSA, larger particles, gas, a foaming agent, and optionally a gelling agent and/or crosslinking agent. In some embodiments, a foamed treatment fluid comprising an NSA may advantageously have an enhanced handling stability that enables use of the foamed treatment fluid and a wider variety of subterranean operations, e.g., enhanced oil recovery operations (e.g., hydraulic fracturing, gravel packing, frac-packing, acidizing), injection well operations, diverting operations, drilling operations, and the like.

Suitable gases for use in conjunction with the present invention may include, but are not limited to, nitrogen, carbon dioxide, air, methane, helium, argon, and any combination thereof. One skilled in the art, with the benefit of this disclosure, should understand the benefit of each gas. By way of nonlimiting example, carbon dioxide foams may have deeper well capability than nitrogen foams because carbon dioxide emulsions have greater density than nitrogen gas foams so that the surface pumping pressure required to reach a corresponding depth is lower with carbon dioxide than with nitrogen.

Suitable foaming agents for use in conjunction with the present invention may include, but are not limited to, cationic foaming agents, anionic foaming agents, amphoteric foaming agents, nonionic foaming agents, or any combination thereof. Nonlimiting examples of suitable foaming agents may include, but are not limited to, surfactants like betaines, sulfated or sulfonated alkoxylates, alkyl quaternary amines, alkoxylated linear alcohols, alkyl sulfonates, alkyl aryl sulfonates, C10-C20 alkyldiphenyl ether sulfonates, polyethylene glycols, ethers of alkylated phenol, sodium dodecylsulfate, alpha olefin sulfonates such as sodium dodecane sulfonate, trimethyl hexadecyl ammonium bromide, and the like, any derivative thereof, or any combination thereof. Foaming agents may be included in foamed treatment fluids at concentrations ranging typically from about 0.05% to about 2% of the liquid component by weight (e.g., from about 0.5 to about 20 gallons per 1000 gallons of liquid).

In some embodiments, the quality of a foamed treatment fluid may range from a lower limit of about 5%, 10%, 25%, 40%, 50%, 60%, or 70% gas volume to an upper limit of about 95%, 90%, 80%, 75%, 60%, or 50% gas volume, and wherein the quality of the foamed treatment fluid may range from any lower limit to any upper limit and encompass any subset therebetween. Most preferably, a foamed treatment fluid may have a foam quality from about 85% to about 95%, or about 90% to about 95%.

Suitable NSA for use in conjunction with the present invention may include, but are not limited to, laponite, silica, alumina, zinc oxide, magnesium oxide, boron, iron oxide, an alkali earth metal or oxide thereof (e.g., magnesium, calcium, strontium, and barium), a transition metal or oxide thereof (e.g., titanium and zinc), a post-transition metal or oxide thereof (e.g., aluminum), or any combination thereof. In some embodiments, an NSA for use in conjunction with the present invention may have a size with at least one dimension ranging from a lower limit of about 2 nm, 5 nm, 10 nm, or 25 nm to an upper limit of about 500 nm, 400 nm, 250 nm, or 100 nm and wherein the size in at least one dimension may range from any lower limit to any upper limit and encompass any subset therebetween.

In some embodiments, an NSA for use in conjunction with the present invention may have a chemically modified surface. Suitable chemical modifications may provide for surface functionalities that include, but are not limited to, amines, amides, alcohols, carboxylic acids, aldehydes, sulfonate, sulfate, sulfosuccinate, thiosulfate, succinate, carboxylate, hydroxyl, glucoside, ethoxylate, propoxylate, phosphate, ether, and the like. One skilled in the chemical arts with the benefit of this disclosure should understand how to produce an NSA having a suitable surface functionality with, inter alia, standard chemical techniques used to functionalize other surfaces having the same chemical nature but not in a nanoparticle form. By way of nonlimiting example, an NSA comprising fumed silica may be reacted with a silyl amine. Further, one skilled in the art with the benefit of this disclosure should understand that the degree of surface functionality may be varied to achieve a varying degree of association between NSA.

In some embodiments, an NSA may be present in a treatment fluid in an amount in the range of from a lower limit of about 0.1%, 1%, or 2% to an upper limit of about 10%, 5%, or 2% by weight of the treatment fluid, and wherein the amount of the NSA may range from any lower limit to any upper limit and encompass any subset therebetween.

Larger particulates suitable for use in conjunction with the present invention may comprise any material suitable for use in subterranean operations. Suitable materials for these larger particulates include, but are not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, barite, meta-silicate, calcium silicate, kaolin, talc, zirconia, boron, fly ash, hollow glass microspheres, solid glass, and combinations thereof. Suitable larger particles for use in conjunction with the present invention may be any known shape of material, including substantially spherical materials, fibrous materials, polygonal materials (such as cubic materials), and combinations thereof. Moreover, fibrous materials, that may or may not be used to bear the pressure of a closed fracture in embodiments where the larger particles are proppant particles, may be included in certain embodiments of the present invention.

In some embodiments, a percentage of the larger particles for use in conjunction with the present invention may be degradable. Suitable degradable materials may include, but are not limited to, dissolvable materials, materials that deform or melt upon heating such as thermoplastic materials, hydrolytically degradable materials, materials degradable by exposure to radiation, materials reactive to acidic fluids, or any combination thereof. In some embodiments, degradable materials may be degraded by temperature, presence of moisture, oxygen, microorganisms, enzymes, pH, free radicals, and the like. In some embodiments, degradation may be initiated in a subsequent treatment fluid introduced into the subterranean formation at some time when diverting is no longer necessary. In some embodiments, degradation may be initiated by a delayed-release acid, such as an acid-releasing degradable material or an encapsulated acid, and this may be included in the treatment fluid comprising the degradable material so as to reduce the pH of the treatment fluid at a desired time, for example, after introduction of the treatment fluid into the subterranean formation. Suitable examples of degradable materials for use in conjunction with the present invention may include, but are not limited to, polysaccharides such as cellulose, chitin, chitosan, proteins, aliphatic polyesters, poly(lactides), poly(glycolides), poly(ε-caprolactones), poly(hydroxyester ethers), poly(hydroxybutyrates), poly(anhydrides), polycarbonates; poly(orthoesters), poly(amino acids), poly(ethylene oxides), poly(phosphazenes), poly (ether esters), polyester amides, polyamides, polyanhydrides, dehydrated compounds that degrade during rehydration (e.g., anhydrous sodium tetraborate (also known as anhydrous borax) and anhydrous boric acid, any derivative thereof, and any combination thereof, including copolymers or blends of any of these degradable polymers.

In some embodiments, larger particles for use in conjunction with the present invention may be at least partially coated with a consolidating agent. As used herein, the term "coating," and the like, does not imply any particular degree of coating on the particulate. In particular, the terms "coat" or "coating" do not imply 100% coverage by the coating on the particulate.

Suitable consolidating agents may include, but are not limited to, non-aqueous tackifying agents, aqueous tackifying agents, emulsified tackifying agents, silyl-modified polyamide compounds, resins, crosslinkable aqueous polymer compositions, polymerizable organic monomer compositions, consolidating agent emulsions, zeta-potential modifying aggregating compositions, and binders. Combinations and/or derivatives of these also may be suitable. Nonlimiting examples of suitable non-aqueous tackifying agents may be found in U.S. Pat. No. 5,853,048 entitled "Control of Fine Particulate Flowback in Subterranean Wells," U.S. Pat. No. 5,839,510 entitled "Control of Particulate Flowback in Subterranean Wells," and U.S. Pat. No. 5,833,000 entitled "Control of Particulate Flowback in Subterranean Wells," and U.S. Patent Application Publication Nos. 2007/0131425 entitled "Aggregating Reagents, Modified Particulate Metal-Oxides, and Methods for Making and Using Same" and 2007/0131422 entitled "Sand Aggregating Reagents, Modified Sands, and Methods for Making and Using Same," the relevant disclosures of which are herein incorporated by reference. Nonlimiting examples of suitable aqueous tackifying agents may be found in U.S. Pat. No. 5,249,627 entitled "Method for Stimulating Methane Production from Coal Seams" and U.S. Pat. No. 4,670,501 entitled "Polymeric Compositions and Methods of Using Them," and U.S. Patent Application Publication Nos. 2005/0277554 entitled "Aqueous Tackifier and Methods of Controlling Particulates" and 2005/0274517 entitled "Aqueous-Based Tackifier Fluids and Methods of Use," the relevant disclosures of which are herein incorporated by reference. Nonlimiting examples of suitable crosslinkable aqueous polymer compositions may be found in U.S. Patent Application Publication Nos. 2010/0160187 entitled "Methods and Compositions for Stabilizing Unconsolidated Particulates in a Subterranean Formation" and 2011/0030950 entitled "Methods for Controlling Particulate Flowback and Migration in a Subterranean Formation," the relevant disclosures of which are herein incorporated by reference. Nonlimiting examples of suitable silyl-modified polyamide compounds may be found in U.S. Pat. No. 6,439,309 entitled "Compositions and Methods for Controlling Particulate Movement in Wellbores and Subterranean Formations," the relevant disclosure of which is herein incorporated by reference. Nonlimiting examples of suitable resins may be found in U.S. Pat. No. 7,673,686 entitled "Method of Stabilizing Unconsolidated Formation for Sand Control," U.S. Pat. No. 7,153,575 entitled "Particulate Material Having Multiple Curable Coatings and Methods of Making and Using the Same," U.S. Pat. No. 6,677,426 entitled "Modified Epoxy Resin Composition, Production Process for the Same and Solvent-Free Coating Comprising the Same," U.S. Pat. No. 6,582,819 entitled "Low Density Composite Proppant, Filtration Media, Gravel Packing Media, and Sports Field Media, and Methods for Making and Using Same," U.S. Pat. No. 6,311,773 entitled "Resin Compositions and Methods of Consolidating Particulate Solids in Wells With and Without Closure Pressure," and U.S. Pat. No. 4,585,064 entitled "High Strength Particulates," and U.S. Patent Application Publication Nos. 2010/0212898 entitled "Methods and Compositions for Consolidating Particulate Matter in a Subterranean Formation" and 2008/0006405 entitled "Methods and Compositions for Enhancing Proppant Pack Conductivity and Strength," the relevant disclosures of which are herein incorporated by reference. Nonlimiting examples of suitable polymerizable organic monomer compositions may be found in U.S. Pat. No. 7,819,192 entitled "Consolidating Agent Emulsions and Associated Methods," the relevant disclosure of which is herein incorporated by reference. Nonlimiting examples of suitable consolidating agent emulsions may be found in U.S. Patent Application Publication No. 2007/0289781 entitled "Consolidating Agents Emulsions and Associated Methods," the relevant disclosure of which is herein incorporated by reference. Nonlimiting examples of suitable zeta-potential modifying aggregating compositions may be found in U.S. Pat. No. 7,956,017 entitled "Aggregating Reagents, Modified Particulate Metal-Oxides and Proppants" and U.S. Pat. No. 7,392,847 entitled "Aggregating Reagents, Modified Particulate Metal-Oxides, and Methods for Making and Using Same," the relevant disclosures of which are herein incorporated by reference. Nonlimiting examples of suitable binders may be found in U.S. Pat. No. 8,003,579 entitled "Oil-, Hot Water- and Heat-Resistant Binders, Process for Preparing Them and Their Use," U.S. Pat. No. 7,825,074 entitled "Hydrolytically and Hydrothermally Stable Consolidation or Change in the Wetting Behavior of Geological Formations," and U.S. Pat. No. 6,287,639 entitled "Composite Materials," and U.S. Patent Application Publication No. 2011/0039737 entitled "Binder for Binding Beds and Loose Formations and Processes for Producing Them," the relevant disclosures of which are herein incorporated by reference. It is within the ability of one skilled in the art, with the benefit of this disclosure, to determine the type and amount of consolidating agent to include in the methods of the present invention to achieve the desired results.

In some embodiments, e.g., particle placement operations, larger particles may be present in a treatment fluid in an amount in the range of from about 0.1 pounds per gallon ("ppg") to about 30 ppg by volume of the treatment fluid.

In some embodiments, a treatment fluid for use in the present invention may further comprise an additive including, but not limited to, salts, weighting agents, inert solids, fluid loss control agents, emulsifiers, dispersion aids, corrosion inhibitors, emulsion thinners, emulsion thickeners, viscosifying agents, gelling agents, crosslinkers, surfactants, particulates, lost circulation materials, foaming agents, gases, pH control additives, breakers, biocides, crosslinkers, stabilizers, clay stabilizing agents, chelating agents, scale inhibitors, mutual solvents, oxidizers, reducers, friction reducers, and any combination thereof.

By way of nonlimiting example, in some embodiments, a treatment fluid for use in conjunction with the present invention may comprise a base fluid, an NSA, and a gelling agent, where the gelling agent is at a concentration of about 0.001% to about 0.1% by weight of the treatment fluid. In some embodiments, the treatment fluid may further comprise optionally larger particles.

By way of another nonlimiting example, in some embodiments, a treatment fluid for use in conjunction with the present invention may comprise a base fluid, an NSA, and a crosslinking agent, where the crosslinking agent is at a concentration of about 0.001% to about 0.1% by weight of the treatment fluid. In some embodiments, the treatment fluid may further comprise optionally larger particles.

By way of yet another nonlimiting example, in some embodiments, a treatment fluid for use in conjunction with the present invention may comprise or consist essentially of a base fluid, an NSA, and a clay stabilizing agent. In some embodiments, the treatment fluid may further comprise optionally larger particles. Use of the clay stabilizing agent may be advantageous when treating a subterranean formation comprising water-sensitive minerals, including treatments via an injection wellbore or a production wellbore. In some embodiments, a clay stabilizing agent may be present in a treatment fluid in an amount in the range of from about 0.01% to about 10% by volume of the treatment fluid.

By way of another nonlimiting example, in some embodiments, treatment fluids (e.g., a drilling fluid) for use in conjunction with the present invention may comprise a base fluid, an NSA, and a fluid loss control additive.

Some embodiments of the present invention may involve introducing a treatment fluid comprising a base fluid, an NSA, and larger particles into at least a portion of a subterranean formation and forming a particle pack.

In some embodiments, a treatment fluid comprising a base fluid and an NSA may be introduced into an injection well penetrating a subterranean formation.

In some embodiments, a treatment fluid comprising a base fluid, an NSA, and optionally larger particles (depending on the treatment operation) may be advantageously used in subterranean formations having elevated bottom hole circulating temperatures, e.g., about 300° F. or greater, about 400° F. or greater, about 500° F. or greater, or about 600° F. or greater. However, a treatment fluid comprising a base fluid, an NSA, and optionally larger particles (depending on the treatment operation) may be suitable for use in subterranean formations having bottom hole circulating temperatures of below about 300° F.

Some embodiments of the present invention may involve treating at least a portion of the subterranean formation prior to and/or after introduction of the treatment fluid comprising a base fluid, an NSA, and larger particles into the portion of the subterranean formation.

Suitable treatments may include, but are not limited to, lost circulation operations, stimulation operations, fracturing operations, sand control operations, completion operations, acidizing operations, scale inhibiting operations, water-blocking operations, clay stabilizer operations, fracturing operations, frac-packing operations, gravel packing operations, wellbore strengthening operations, sag control operations, remedial operations (e.g., NSA breaking operations), and producing hydrocarbons. The methods and compositions of the present invention may be used in full-scale operations or pills. As used herein, a "pill" is a type of relatively small volume of specially prepared treatment fluid placed or circulated in the wellbore.

By way of nonlimiting example, some embodiments of the present invention may involve fracturing at least a portion of the subterranean formation prior to introduction of a treatment fluid comprising an NSA and larger particles. Some embodiments of the present invention may involve introducing a pad fluid into at least a portion of the subterranean formation at a pressure sufficient to create or extend at least one fracture, and then introducing a proppant slurry fluid comprising a base fluid, an NSA, and proppant particles into the subterranean formation, and forming a proppant pack in the fracture. In some embodiments, the proppant slurry fluid may be a foamed fluid. In some embodiments, introduction of the proppant slurry fluid may be via a deviated wellbore.

By way of another nonlimiting example, some embodiments of the present invention may involve placing the screen in a wellbore so as to create an annulus between the screen and the wellbore, and then introducing a treatment fluid comprising an NSA and larger particles, so as to form a gravel pack of larger particles between the screen and the wellbore. In some embodiments, the treatment fluid may be a foamed fluid. In some embodiments, introduction of the treatment fluid may be via a deviated wellbore.

By way of another nonlimiting example, some embodiments of the present invention may involve introducing a treatment fluid comprising an NSA and larger particles into a subterranean formation, and then producing hydrocarbons from the subterranean formation. Some embodiments of the present invention may involve introducing a treatment fluid comprising a base fluid, an NSA, and larger particles into at least a portion of a subterranean formation, forming a particle pack, and producing hydrocarbons from the subterranean formation. In some embodiments, the treatment fluid may be a foamed fluid. In some embodiments, introduction of the treatment fluid may be via a deviated wellbore.

By way of yet another nonlimiting example, some embodiments of the present invention may involve drilling a wellbore with a drilling fluid comprising a base fluid and an NSA, where cuttings produced during drilling are suspended and transported to the surface by the drilling fluid. In some embodiments, the wellbore may be a deviated wellbore. In some embodiments, the drilling fluid may be a foamed fluid.

By way of another nonlimiting example, some embodiments of the present invention may involve introducing a treatment fluid comprising a base fluid and an NSA into a subterranean formation via an injection well so as to enhance hydrocarbon production at a proximal production well. In some embodiments, the treatment fluid may be foamed and further comprise a foaming agent and a gas.

By way of yet another nonlimiting example, some embodiments of the present invention may involve a diverting fluid comprising a base fluid and an NSA into a zone within a subterranean formation via a wellbore, allowing the diverting fluid to seal rock surfaces of the zone of the subterranean formation for fluid diversion; and introducing a treatment fluid into the subterranean formation such that the diverting fluid substantially diverts the treatment fluid from the zone within the subterranean formation. In some embodiments, the treatment fluid may be foamed and further comprise a foaming agent and a gas.

To facilitate a better understanding of the present invention, the following examples of preferred or representative embodiments are given. In no way should the following examples be read to limit, or to define, the scope of the invention.

EXAMPLES

Example 1

Two gelled fluids were prepared with hydroxypropyl guar at a concentration of 10 lb/Mgal (pounds per 1000 gallons) or 25 lbs/Mgal in a 2% KCl brine.

Three samples were prepared to test the settling time of 20/40-mesh Brady sand. A control sample was 25 lbs/Mgal gelled fluid, no nanoparticles were added. Nanoparticle sample 1 was 2% by weight of CAB-O-SIL® M-50 (untreated fumed silica, available from Cabot Corporation) in the 25 lbs/Mgal gelled fluid. Nanoparticle sample 2 was 2% by weight of CABOSIL® M-50 in the 10 lbs/Mgal gelled fluid.

In individual 8 oz. jars, 100 mL of each sample was added. Then, 50 grams of 20/40-mesh Brady sand was added to each bottle and well mixed to form a homogeneous suspension. The samples were then allowed to sit undisturbed for at least one hour. The samples were photographed and visually inspected for a degree of settling at 5 seconds, 30 second, 10 minutes, and 1 hour. As a general indicator of settling, the clarity of the fluid above the 100% settled line, i.e., the top of the sand when completely settled, was characterized. "Clear" indicates little to no particulate suspended. "Cloudy" indicates a significant portion of the particulates have settled. "Opaque" indicates a large amount of particulates suspended therein. Table 1 provides a measure of what percentage of the fluid can be characterized as each degree of settling. Because the samples are settling, the clear fluid is at the top, the cloudy in the middle, and the opaque at the bottom. That is, higher clear and cloudy percentages indicates settling.

TABLE 1

|  | Nanoparticle Sample 1 | | | | Nanoparticle Sample 2 | | | | Control Sample | | | |
| --- | --- | --- | --- | --- | --- | --- | --- | --- | --- | --- | --- | --- |
| Time | 5 s | 30 s | 10 m | 1 h | 5 s | 30 s | 10 m | 1 h | 5 s | 30 s | 10 m | 1 h |
| Clear | 0 | 0 | 0 | 0 | 0 | 0 | 10 | 25 | 30 | 100 | 100 | 100 |
| Cloudy | 0 | 0 | 0 | 20 | 0 | 0 | 15 | 5 | 45 | 0 | 0 | 0 |
| Opaque | 100 | 100 | 100 | 80 | 100 | 100 | 75 | 70 | 25 | 0 | 0 | 0 |

As illustrated by the percentages in Table 1, the addition of nanoparticles, even at reduced gel concentrations, hindered settling of the Brady sand.

Example 2

A foam was prepared with an aqueous base fluid, 0.25% (v/v) of a cationic surfactant, 3% (w/w) fumed silica, and 9 ppg 20/40 bauxite. At a temperature of 140° F. for 5 hours, the foam maintained suspension of the bauxite.

Example 3

A kerosene-based fluid was prepared with 2% (w/v) of fumed silica. The fluid remained stable in a water bath at 180° F. for 4 hours.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
introducing a treatment fluid into an injection wellbore penetrating a subterranean formation, the treatment fluid comprising a base fluid, a foaming agent, a gas, and a nanoparticle suspension aid, wherein the treatment fluid further comprises a gelling agent present in an amount of about 0.001% to about 0.1% by weight of the treatment fluid, a crosslinking agent present in an amount of about 0.001% to about 0.1% by weight of the treatment fluid, or a combination thereof; and
producing hydrocarbons from the subterranean formation via a production wellbore proximal to the injection wellbore.

2. The method of claim 1, wherein the nanoparticle suspension aid comprises at least one selected from the group consisting of laponite, silica, alumina, zinc oxide, magnesium oxide, boron, iron oxide, an alkali earth metal or oxide thereof, a transition metal or oxide thereof, a post-transition metal or oxide thereof, and any combination thereof.

3. The method of claim 1, wherein the nanoparticle suspension aid has a size in at least one dimension ranging from about 2 nm to about 500 nm.

4. The method of claim 1, wherein the nanoparticle suspension aid has a chemically modified surface.

5. The method of claim 1, wherein the nanoparticle suspension aid is present in the treatment fluid in an amount ranging from about 0.1% to about 10% by weight of the treatment fluid.

6. The method of claim 1, wherein the treatment fluid further comprises a clay stabilizing agent.

7. The method of claim 1, wherein the injection wellbore has a bottom hole circulating temperature of about 300° F. or greater.

8. The method of claim 1, wherein the wellbore is a deviated wellbore.

9. The method of claim 1, wherein the foaming agent comprises one selected from the group consisting of a sulfated alkoxylate, a sulfonated alkoxylate, an alkoxylated linear alcohol, an alkyl sulfonate, an alkyl aryl sulfonate, a C10-C20 alkyldiphenyl ether sulfonate, a polyethylene glycol, an ether of alkylated phenol, sodium dodecylsulfate, an alpha olefin sulfonate, trimethyl hexadecyl ammonium bromide, any derivative thereof, and any combination thereof.

10. The method of claim 1, wherein the injection wellbore has a bottom hole circulating temperature of about 400° F. or greater.

11. A method comprising:
introducing a diverting fluid into a zone within a subterranean formation via a wellbore, the diverting fluid comprising a base fluid, a foaming agent, a gas, and a nanoparticle suspension aid, wherein the treatment fluid further comprises a gelling agent present in an amount of about 0.001% to about 0.1% by weight of the treatment fluid, a crosslinking agent present in an amount of about 0.001% to about 0.1% by weight of the treatment fluid, or a combination thereof;
allowing the diverting fluid to seal rock surfaces of the zone of the subterranean formation for fluid diversion; and
introducing a treatment fluid into the subterranean formation such that the diverting fluid substantially diverts the treatment fluid from the zone within the subterranean formation.

12. The method of claim 11, wherein the nanoparticle suspension aid has a size in at least one dimension ranging from about 2 nm to about 500 nm.

13. The method of claim 11, wherein the nanoparticle suspension aid is present in the treatment fluid in an amount ranging from about 0.1% to about 10% by weight of the treatment fluid.

14. The method of claim 11, wherein the wellbore has bottom hole circulating temperature of about 300° F. or greater.

15. A method comprising:
   introducing a treatment fluid into a subterranean formation via a wellbore having a bottom hole circulating temperature of about 300° F. or greater, the treatment fluid comprising a base fluid, a foaming agent, a gas, and a nanoparticle suspension aid, wherein the treatment fluid further comprises a gelling agent present in an amount of about 0.001% to about 0.1% by weight of the treatment fluid, a crosslinking agent present in an amount of about 0.001% to about 0.1% by weight of the treatment fluid, or a combination thereof.

16. The method of claim 15, wherein the treatment fluid further comprises proppant particles or gravel particles.

17. The method of claim 15, wherein the treatment fluid further comprises a clay stabilizing agent.

18. The method of claim 15, wherein the nanoparticle suspension aid is present in the treatment fluid in an amount ranging from about 0.1% to about 10% by weight of the treatment fluid.

* * * * *